Oct. 29, 1968 KAZUO OBUCHI 3,408,217

FINGERPRINT RECORDING

Filed June 29, 1965

INVENTOR.
KAZUO OBUCHI
BY
Buckman and Archer
HIS ATTORNEY 3,408,217

FINGERPRINT RECORDING

Kazuo Obuchi, Kanagawa-ken, Japan, assignor to Fuji Shashin Film Kabushiki Kaisha, Kanagawa-ken, Japan Filed June 29, 1965, Ser. No. 467,899
Claims priority, application Japan, July 1, 1964, 39/37,231
4 Claims. (Cl. 117—.5)

The present invention relates to an improved fingerprint recording method by utilizing an electrostatic phenomenon and more particularly to a fingerprint recording method of xerography.

A method for recording fingerprints and palms (they are designated only "fingerprints" hereinafter in the specification and the claims) by using an electrostatic phenomenon has already been disclosed in Japanese Patent 290,926. That is, the method of the patent comprising using as a fingerprint recording material a layer of high insulating resin in which a suitable pigment is dispersed as a charge controlling agent, coated on an electrically conductive or low insulating support, applying a uniform electrostatic charge on the surface of the recording layer prior to the fingerprint recording, for example, by the charging method well known in xerography, impressing fingers or a palm thereupon so as to liberate the electrostatic charge in accordance with the fingerprints, thus recording the impression of the fingerprints as an electrostatic pattern, and then developing and fixing the electrostatic pattern by a method well known in xerography. This method will be more particularly described hereinafter in the body of the present application.

The method as described above is favorably compared with a conventional method using ink or inking-pad since fingers and palms are not stained in the above method and further the resulting impressions are chemically and physically stable as well as preservable for a long period of time. However, some disadvantages are unavoidable in the practice of the above-mentioned xerographic method.

The first disadvantage is that a high voltage such as 4000 v. or above is required in the case of using the corona discharging method as a charging method. The second is that unnecessary matters besides the necessary fingerprint are recorded if the charged recording material is carelessly handled. The third is that the background of the recording surface tends to be spoiled by non-uniform charge and pinholes caused by the reversal development necessary for obtaining the positive image of the fingerprint.

The present invention utilizes the electrostatic phenomenon similarly as in the method as described above, but such disadvantages can be substantially overcome without losing the merits of the prior method.

Figure 1:
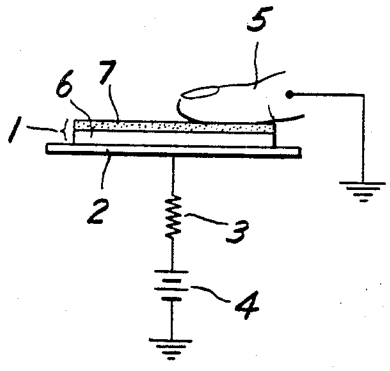
Figure 2:
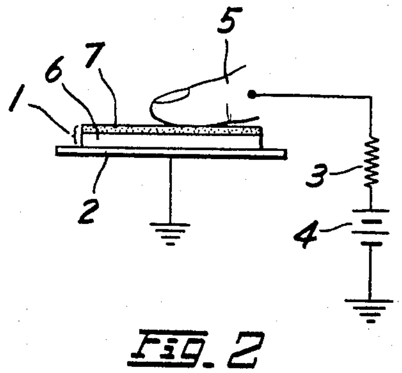
Figure 3:
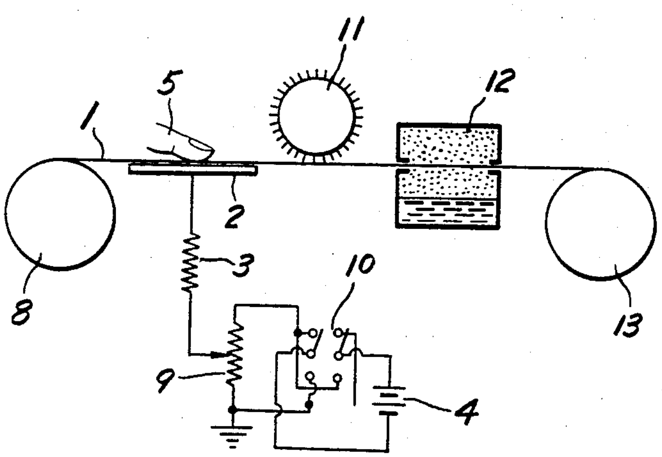

The invention will be explained in detail referring to the accompanying drawings, in which:

FIG. 1 and FIG. 2 are views showng the principle of the fingerprint recording of this invention; and FIG. 3 is a view showing an embodiment of an apparatus suitable for effecting the fingerprint recording method of this invention.

In FIG. 1, the numeral 1 is a fingerprint recording material which is composed of an electrically conductive or low insulating support 6 and a recording layer 7 consisting of a high insulating resin.

As the high insulating resin, for example, silicone resin, vinyl chloride-vinyl acetate copolymer, polymethyl methacrylate resin, polystyrene resin, chlorinated rubber and polyvinyl acetate are acceptable. Silica-gel, titanium white or talcum may be dispersed in them, especially silica-gel being preferable. As the support, a metal foil such as an aluminum foil or a paper may be used.

The numeral 2 is an electrically conductive electrode, for example, a metal plate which is held by a suitable insulating support. The electrode 2 is connected to an end of a direct current source 4 through a resistor 3 and the other end of the direct current source is grounded. The polarity of the direct current source is determined according to the recording material to be used and the developer described hereinafter. When a finger 5 or palm is brought into contact with the recording layer 7, a closed circuit is formed, because the human body is ordinarily in the grounded state, and the recording layer 7 acts as a condenser with the electrodes of the support 6 and the finger 5, and is charged up. The electrostatic charge is kept on the recording layer after the finger 5 is removed and the patern of distribution corresponds to the fingerprint. The resistor 3 is provided for the purpose of protecting the human body from the accidental passage of a high current, when the human body is carelessly brought into contact with the electrode 2 and therefore, the value of the resistance must be determined to such extent that the electric current is not sensed by the human body. One experimental result shows that $5\times10^8$ ohms is satisfactory for the applying voltage of 1000 v. in this case, the electric current passing through the human body is less than 2 $\mu$amp., which is too low to be sensed by the human body at all, and is not dangerous.

In general, as the human body is in the grounded state, it is not necesary to connect the grounding end of the direct current source 4 to the human body, but as occasion demands, the human body may be grounded by letting it grasp a metal piece or putting a metal ring on its finger or arm, the metal piece or the metal ring being grounded by a wire.

FIG. 2 shows the case where the electrode is grounded and the voltage is applied to the human body. In this case also, recording of fingerprints is possible, but the operation is somewhat difficult because of the fact that the human body must be insuated. If the electrification of the human body by the friction between the human body and the clothes or the electrification between the human body and the carpet on which such human body may be standing is utilized, for the particular case, the direct current source may be omitted. But such electrification, being very unstable and dependent upon the atmospheric condition to a great extent, cannot be put into practical use.

In accordance with the present invention, considerably low applying voltage is acceptable, e.g. in one experimental result, applying voltage of 200 v. gives an acceptable impression for practical use. This is an advantage to simplify the apparatus for carrying out this method.

In this method, unnecessary patterns are not recorded during other operations, since the recording material has sensitivity to the fingerprint only when it is placed on the electrode 2 and a voltage is applied to the electrode.

Further, in this method, the background is not spoiled due to the non-uniform distribution of the electrostatic charge, because only the fingerprint part receives the electrostatic charge. The normal development can be used as the developing method, and therefore, the troubles due to the reversal development can be completely eliminated.

The electrostatic patterns corresponding to the fingerprints obtained by the aforementioned method are visualized and fixed by the developing and fixing methods which are well known in xerography. The resulting impression is physically and chemically stable and capable of a long preservation.

In conducting the fingerprint recording of this invention, a finger or palm is not stained, and thus no cleansing treatment is required.

FIG. 3 is representative of one embodiment of this invention, wherein the numeral 8 is a supply roll of recording paper 1, the numeral 2 is an electrically conductive electrode to which a voltage is applied through a resistor 3, and the numeral 9 is a voltage controller, for example, a potentiometer which controls the voltage applied to the electrode 2. Such a voltage controller is required from the experimental result that a relatively low voltage gives a clear impression in the case of relatively moist finger, while only a relatively high voltage gives a clear impression in the case of dry finger. Therefore, it must be adjusted to an optimum condition in accordance with the condition of the finger. Such adjustment is difficult in the method disclosed by Japanese Patent 290,926. The numeral 10 is a switch for changing the polarity of applying voltage, by which both positive and negative impressions can be obtained. A developing apparatus 11 such as a magnetic brush is provided to develop the electrostatic pattern corresponding to the fingerprint. As the developing method, all of the methods which are well known in xerography can be used besides the magnetic brush developing method. The thus developed recording paper is then introduced in a fixing device 12 in which the impression is fixed, e.g., by a solvent vapor method, to be endowed with a long preservability.

As the fixing method, all of the methods well known in xerography can be also used besides the solvent vapor fixing method. The already impressed and recorded recording paper is then rolled up by a roll 13. With regard to the developing method of the aforesaid patent, there is disclosed the dispensing of powdered material on the insulator so that the powder is drawn electrically to the charged parts of the latent image (charge pattern) and is adhered thereto. Thus, the image becomes visible, and it is this visible image which can be fixed either on the insulator (or recording material) directly or transferred and fixed on other suitable paper. For example, the powdered image can be fixed directly on the insulator (or recording material) by heating the powder to above its melting point, or it can be fixed to a paper laid over the image prior to the application of heat.

In addition to the apparatus as shown in FIG. 3 wherein a web-like recording material is used, a sheet-like recording material may be employed.

As a fingerprint recording material, a high insulating plastic film may be employed besides an insulating resin coated on a support as shown in FIG. 1.

In the above explanation of the invention, the fingerprint impression is fixed on a recording material, but it should be understood that it may be transferred onto other supports by the method well known in xerography.

Furthermore, a number of copies can be made by using a fingerprint recording material itself as a master or transferring the fingerprint impression onto an offset master sheet and printing. In this case, a number of copies can be obtained without losing its definition different from the case through an optical system.

The following example is illustrative of our invention.

EXAMPLE

The following mixture was adequately blended and coated on a paper followed by drying:

| | Parts by weight |
|---|---|
| Polyvinyl chloride-vinyl acetate copolymer (mole ratio 7:3, degree of polymerization: about 300) | 100 |
| Powdered silica-gel | 20 |
| Trichloroethylene | 100 |
| Toluene | 50 |

When a finger was impressed to the resulting recording material while applying a direct current voltage of 500–1000 v. thereto through a resistor of 100–500M ohms, followed by the conventional xerographic development and fixing, a clear and preservable fingerprint record was obtained.

What is claimed is:

1. A method of recording a print which comprises placing a recording material consisting of a high insulating resin having a capacity for receiving static electricity on an electrically conductive electrode, connecting circuit means between an extremity of a human being which is to be printed and said electrically conductive electrode comprising a direct current voltage source and ground, bringing said extremity into contact with the surface of the recording material whereby to form an electrostatic pattern corresponding to the print made by said extremity, and developing said electrostatic pattern by depositing powdered material on the formed charge pattern so that the pattern is made visible by said powder being electrically drawn to the charged parts and adhering thereto, and fixing the visible image.

2. The method of claim 1 wherein said visible image is fixed directly to said recording material by heating said powder above its melting point.

3. The method of claim 1 wherein said visible image is transferred from said surface of said recording material and fixed to a paper laid over said image by the application of said heat which causes said powders to melt and fuse to said paper.

4. The method of claim 1 wherein said visible image is fixed by a solvent vapor method.

References Cited

UNITED STATES PATENTS

| | | | |
|---|---|---|---|
| 3,108,894 | 10/1963 | Stowell | 117—7.5 |
| 3,320,060 | 5/1957 | Goffe | 96—1.1 |
| 3,260,195 | 7/1966 | Opdycke et al. | 117—17.5 |
| 3,277,493 | 10/1966 | Fyler | 117—17.5 |
| 3,206,600 | 9/1965 | Gold | 117—17.5 |

MURRAY KATZ, *Primary Examiner.*